(No Model.)
L. BARNES, Sr. & C. O. BARNES.
CRANK SHAFT FOR BICYCLES.
No. 563,729. Patented July 14, 1896.
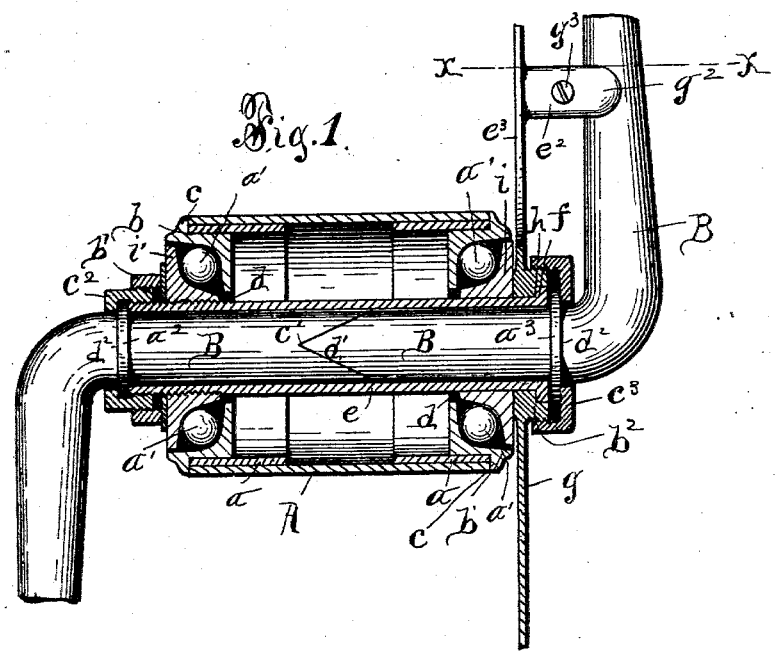
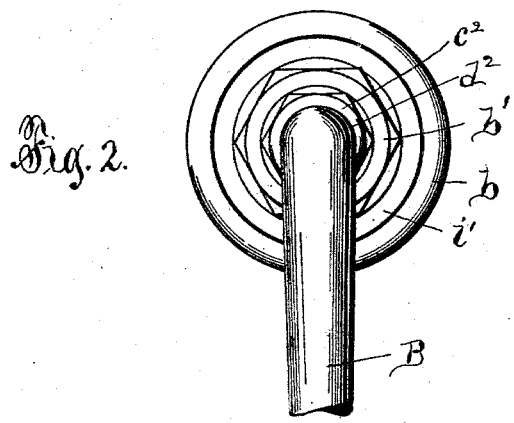
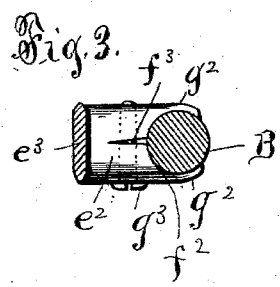
WITNESSES:
INVENTORS:

UNITED STATES PATENT OFFICE.

LUCIEN BARNES, SR., AND CHARLES O. BARNES, OF SYRACUSE, NEW YORK.

CRANK-SHAFT FOR BICYCLES.

SPECIFICATION forming part of Letters Patent No. 563,729, dated July 14, 1896.

Application filed August 16, 1895. Serial No. 559,488. (No model.)

*To all whom it may concern:*

Be it known that we, LUCIEN BARNES, Sr., and CHARLES O. BARNES, of Syracuse, in the county of Onondaga, in the State of New York, have invented new and useful Improvements in Crank-Shafts for Bicycles, of which the following, taken in connection with the accompanying drawings, is a full, clear, and exact description.

This invention relates to the crank-shaft of the driving or propelling mechanism of bicycles, and it has special reference to the class of shafts formed of two sections secured together end to end.

The object of this invention is to provide a simple construction and one that is cheap in its manufacture and at the same time will be strong and durable and efficient in its operation, whereby said shaft can be readily removed from the crank-hanger without disturbing the relative positions of the other parts; and to that end the invention consists in the combination of a crank-hanger provided with suitable journal cups or bearings, said cups being provided with the usual openings or holes, a sleeve extending through said holes independent of the cups and formed with a flange on one end and provided on the other end with a thread, the sprocket-wheel on the flanged end of said sleeve and having its outer face formed with an externally-screw-threaded hub, a socket formed in said hub to receive the flange on said sleeve, a journal ring or cone rigidly secured on said sleeve adjacent to the sprocket-wheel, an adjustable journal ring or cone on said screw-threaded end of the sleeve, balls between said cones and cups, the two crank-sections secured together end to end by means of an interlocking splice and each formed with a collar, the collar on one section bearing against the screw-threaded end of the sleeve and a collar on the other section adjacent to the flange on the opposite end of the sleeve with a take-up space between them, cup-shaped nuts mounted loosely on said section bearing against the outer sides of the collars thereon and engaging, respectively, the screw-threaded end of the sleeve and screw-threaded end of the sprocket-wheel, the nut on the screw-threaded end of the sleeve being provided with a thread on its exterior, a jam-nut on said screw-threaded nut bearing against the outside of the adjustable cone to hold the same in its adjusted position, and a brace connecting one of the spokes of the sprocket-wheel and the adjacent crank-section; and the invention also consists in the novel details of construction as hereinafter more fully described, and specifically set forth in the claims.

The invention is fully illustrated in the annexed drawings, in which—

Figure 1 is a longitudinal section of a crank-hanger of a bicycle provided with our improved crank-shaft. Fig. 2 is an end view of the same, and Fig. 3 is a view on line X X, Fig. 1.

Similar letters of reference indicate corresponding parts.

A represents the crank-hanger preferably formed from a tube, and secured in the ends of said tube are journal bearings or cups $b\,b$, formed with the flanges $c\,c$, by which they bear against the ends of said tube. Said cups are formed with the usual holes or openings $d\,d$, and extending through said openings independent of the cups is a horizontal sleeve $e$, formed on one end with a thread and on the opposite end with a flange $f$. On the latter end of the sleeve is mounted a sprocket-wheel $g$, having its hub $b''$ screw-threaded externally and provided with a socket $h$ to receive the aforesaid flange of the sleeve. On said sleeve and adjacent to the sprocket-wheel is rigidly secured a journal ring or cone $i$, and on the screw-threaded end of the sleeve is mounted the adjustable journal ring or cone $i'$, and between said cones and the cups $b\,b$ are interposed the usual antifriction-balls $a'\,a'$. Embraced by the sleeve $e$ are the two crank-sections B B, which are spliced together by means of a V-shaped notch $c'$, formed in the end of one section, and a correspondingly-shaped tongue $d'$, formed on the adjacent end of the other section, whereby said sections are interlocked to rotate together. Said sections are formed, respectively, with collars $a''$ and $a'''$, the collar $a''$ bearing against the screw-threaded end of the sleeve $e$, and the collar $a'''$ adjacent to the flange $f$ formed on the opposite end of the sleeve with a take-up space between them in case of wear.

On the crank-sections B B are loosely journaled the cup-shaped nuts $c''$ and $c'''$, respectively, which bear against the outer sides of the collars $a''$ and $a'''$ formed on said sections, as aforesaid, the nut $c''$ engaging the screw-threaded end of the sleeve and the nut $c'''$ engaging the screw-threaded hub $b''$ of the sprocket-wheel $g$. The nut $c''$ is formed on its exterior with a screw-thread, and mounted thereon is a jam-nut $b'$, which bears against the outside of the cone $i'$ to hold the same in its adjusted position. The nuts $c''$ and $c'''$ are provided with apertures $b''$ sufficiently large to be slipped over the crank-sections from their outer ends.

To form a more rigid connection between the sprocket-wheel $g$ and the adjacent crank-section B, we preferably provide a brace $e''$, which consists of an arm secured at one end to the spoke $e'''$ of the sprocket-wheel and extending outward and formed at its free end with an annular recess $f''$ and split longitudinally from said recess part way its length, as shown at $f'''$, thus forming two jaws $g''$ $g''$, which lap onto the crank, and through said jaws passes a screw or bolt $g'''$ to draw said jaws together and thereby firmly grip the crank-section, as clearly shown in Fig. 3 of the drawings.

Having described our invention, what we claim, and desire to secure by Letters Patent, is—

1. The combination of two crank-sections formed with interlocking splices, a sleeve embracing said sections screw-threaded at one end, a sprocket-wheel on the opposite end of said sleeve, a collar on each section adapted to bear against the ends of said sleeve with a take-up space at one end, two nuts working respectively on the end of the sleeve and hub of the sprocket-wheel and bearing against the outer sides of said collars to draw said sections together, journals or cones on said sleeve and suitable antifriction-bearings for said cones as set forth.

2. The combination of the crank-hanger, two crank-sections formed with interlocking splices, a sleeve embracing said sections, screw-threaded externally at one end and formed with a flange or collar at the opposite end, a collar on one of said sections bearing against the screw-threaded end of the sleeve and another collar on the other section adjacent to the collar on said sleeve with a take-up space between them, the sprocket-wheel on said sleeve adjacent to the collar thereon and having its hub screw-threaded externally, a cup-shaped nut journaled on each of said sections, bearing against the outer side of the collar thereon and engaging respectively the hub of the sprocket-wheel and screw-threaded portion of the sleeve to draw said sections together, a journal ring or cone secured on one end portion of said sleeve, an adjustable journal ring or cone on the screw-threaded or opposite end portion of the sleeve, a jam-nut holding the latter cone in its adjusted position, suitable bearing-cups secured in the ends of the crank-hanger, and balls between said cones and cups as set forth and shown.

3. The combination of two crank-sections formed with interlocking splices, a sleeve embracing said sections having a collar formed on one end to hold the sprocket-wheel thereon, said wheel having its hub screw-threaded externally, and said sleeve being screw-threaded externally at its opposite end, collars formed on said sections adjacent to the ends of said sleeve, a cup-shaped nut journaled on each of said sections bearing against the outer sides of said collars and engaging respectively the screw-threaded hub of the sprocket-wheel and screw-threaded end of the sleeve to draw said sections together, cones on said sleeve, suitable bearings for said cones, and suitable connections between the sprocket-wheel and crank as set forth.

In testimony whereof we have hereunto signed our names this 6th day of August, 1895.

LUCIEN BARNES, Sr. [L. S.]
  CHARLES O. BARNES. [L. S.]

Witnesses:
 J. J. LAASS,
 C. L. BENDIXON.